March 6, 1928. 1,661,359

W. A. CHRYST ET AL

LIQUID SUPPLY APPARATUS

Filed May 28, 1925

STRAINER

Inventors
William A. Chryst
and Herbert C. Walters
By Spencer Sewall & Hardman
their Attorneys Patented Mar. 6, 1928.

1,661,359

UNITED STATES PATENT OFFICE.

WILLIAM A. CHRYST AND HERBERT C. WALTERS, OF DAYTON, OHIO, ASSIGNORS, BY MESNE ASSIGNMENTS, TO DELCO-REMY CORPORATION, OF DAYTON, OHIO, A CORPORATION OF DELAWARE.

LIQUID-SUPPLY APPARATUS.

Application filed May 28, 1925. Serial No. 33,469.

This invention relates to liquid supply device, particularly for supplying gasoline to the engine of an automobile. One of the objects of the invention is to provide a fuel supply apparatus including a tank, an electric pump associated therewith, said pump being a unitary structure which is adapted to be supported by the tank and includes a liquid duct extending through an opening in or near the top wall of the tank, the housing for the pump serving as a cover for the opening in the tank.

Other objects include simplicity of construction and consequent reduction in the cost of manufacture.

Further objects and advantages of the present invention will be apparent from the following description, reference being had to the accompanying drawings, wherein a preferred form of the present invention is clearly shown.

Figures 1, 2:
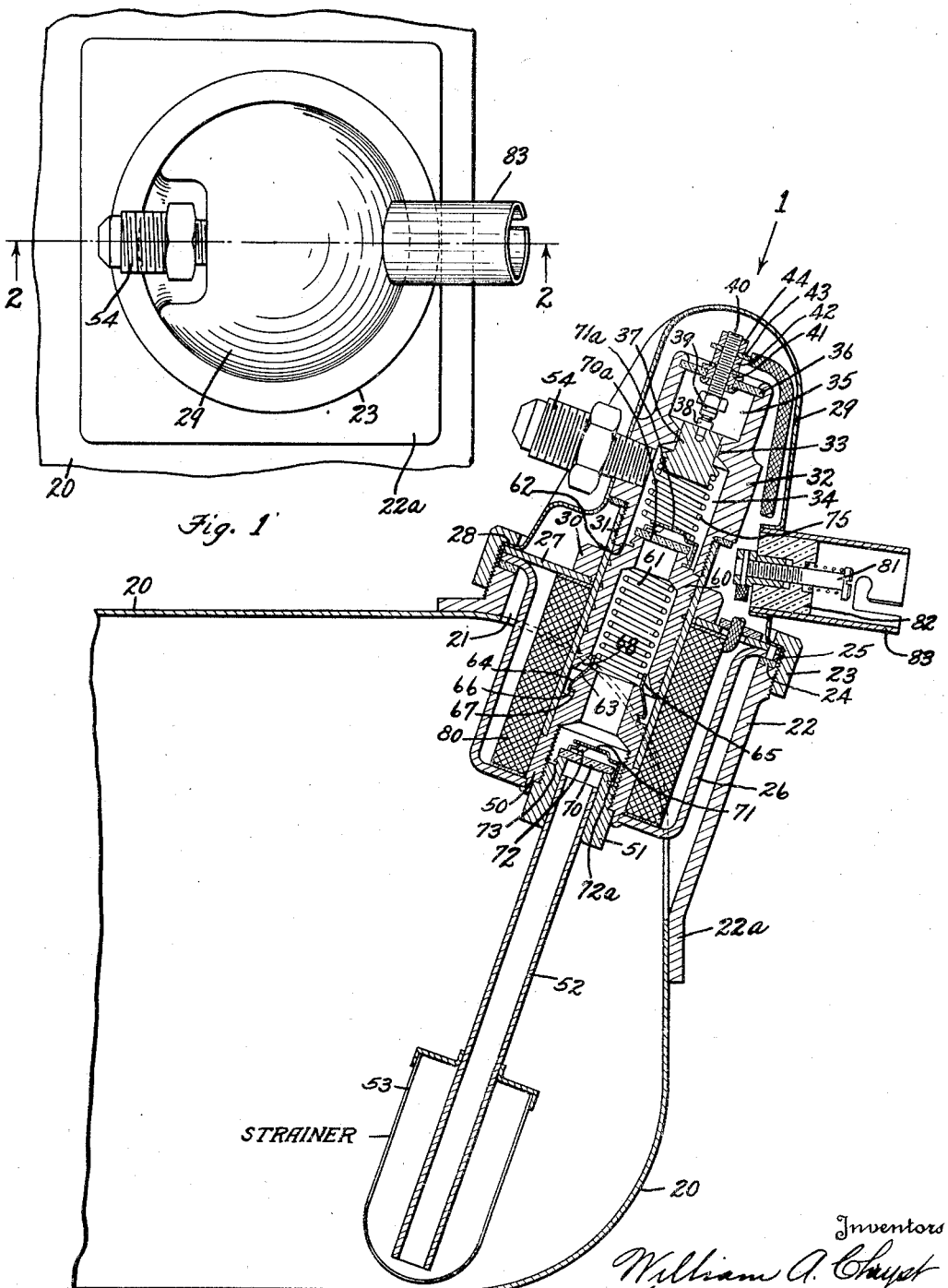
Fig. 1 is a plan view of the apparatus shown in Fig. 2, looking in the direction of the arrow 1 in Fig. 2.
Fig. 2 is a longitudinal sectional view on the line 2—2 of Fig. 1.

Referring to the drawings, 20 designates a liquid tank, such as the rear fuel tank of an automobile. The tank is provided with an opening 21 near the top wall thereof, the opening being surrounded by a tubular member 22 having a flange 22ª which is welded to or otherwise permanently fastened to the metal wall of the tank 20. The tube 22 is threaded to receive a nut 23 which clamps against the end of the tube 22, a gasket 24, a flange 25 of a cup-shaped magnetizable housing member 26, the periphery of a magnetizable plate 27 and the flange 28 of a somewhat conical housing member 29. The members 26 and 29 provide a housing for the pump and the plate 27 constitutes a partition dividing the housing into two compartments and also supporting a magnetizable bushing 30 which surrounds a non-magnetizable tube 31 forming a part of the fuel duct and providing a pump cylinder. The tube 31 is threaded at its upper end to receive a tubular member 32 which is provided with an annular, inwardly-extending ledge 33 dividing the tube 32 into a spring chamber 34 and a contact chamber 35, the outer end of which is closed by a non-conducting disc 36. The annular flange 33 is provided with a central aperture for receiving a movable contact support 37 carrying a movable contact 38 which cooperates with a stationary contact 39 mounted on the lower end of an adjusting screw 40 which is threaded into a bushing 41 carried by the disc 36. The screw is held in adjusted position by lock nut 42. The screw 40 provides for connecting a wire terminal clip 43 which is held by a nut 44.

The lower wall of the housing 26 supports a tubular magnetizable core member 50 a portion of which is received by the tube 31. The member 50 is threaded to receive a bushing 51 carrying an inlet pipe 52 which extends near the bottom of the tank 20. The tube 52 carries a strainer 53. The members 52, 51, 50, 31 and 32 provide a liquid duct extending from the bottom of the tank to a point above the tank where the outlet from the member 32 is connected with a pipe coupling 54.

The pumping mechanism within the liquid duct includes a piston 60 which reciprocates within the cylinder 31 and between the upper portion of the member 50 and the lower portion of the member 32. The piston 60 is moved downwardly by an electromagnet to be described later, and upwardly by a spring 61 which is received within the piston 60, and bears against the wall of the piston at its upper end, and bears at its lower end against the upper end of the member 50. In order to cushion the movement of the piston upwardly into engagement with the member 32, an annular groove 62 is provided in the upper wall of the piston and is telescopically engaged with the lower end of the member 32 in order to provide a cushioning dashpot. The member 50 is provided with an extension having a conical surface 63 which receives a non-magnetizable tube 64 having a corresponding conical surface and a cylindrical surface 65 extending a short distance above the upper end of the member 50. The member 64 is provided with an annular, inwardly-extending flange 66 which is received by a groove 67 in the member 50 thereby retaining the member 64 in position. The cylindrical portion 65 receives the lower end of spring 61 to maintain it in position and the portion 65 is telescopically received by the central bore of the piston 60 in order to provide a cushioning dashpot between the member 64 and the lower end of the piston which is provided with a conical surface 68 for receiving the conical surface of the member 64. By cushioning the to-and-fro movements of the piston at the end of each stroke, the pump is rendered practically noiseless. The tube 64 provides a non-magnetizable stop limiting movement of the piston 60 toward the core 50.

The pump inlet valve comprises a disc 70 which co-operates with a seat provided in the upper end of the bushing 51. The disc 70 is retained by a cage comprising a disc 71 spaced from the upper end of the bushing 51 and attached thereto by three legs 72, each of which is provided at its lower end with an inwardly-extending flange 72ª received by a groove 73 provided by the bushing 51. The piston outlet valve is provided by a disc 70ª which is retained upon the upper end of the piston by a valve cage 71ª the disc and cage corresponding in construction and function to the parts 70 and 71, respectively, described. The valve cage 71ª serves also to receive and retain the lower end of a spring 75 the upper end of which receives the lower end of the contact support 37.

The mechanism for operating the pump includes the spring 61 for moving the piston 60 upwardly and an electro-magnet for moving the piston downwardly. The electro-magnet comprises a magnet winding 80 surrounding the core member 50 and the tube 31. The magnetic circuit of the magnet comprises the member 50, the housing 26, plate 27, collar 30 and the pump piston 60 which constitutes a movable magnetizable core or armature. The stationary, insulated contact 39 is connected with one end of the magnet coil 80 and the other end is connected with a terminal 81, insulatingly supported by a socket base 82 closing one end of a socket tube 83 of the conventional type, for receiving a plug having a terminal adapted to be engaged by the terminal 81. In this manner the terminal 81 is connected by a wire with the battery or other current source, having a ground connection with the tank 20. In a vehicle, the tank 20 is supported by a metallic connection with the frame of the vehicle upon which the storage battery is grounded. The ground connection of the pump is provided by the contact 38 which is connected by metallic parts with the nut 23.

When the terminal 81 is connected with a current source and the contacts 38 and 39 are in engagement as shown, the coil 80 will be energized and will attract the piston 60. Movement of the piston 60 toward the stationary core member 50 will cause the pressure of the spring 75 upon the contacts 38 and 39 to be relieved, thereby causing the circuit to be broken at the contacts. Then the magnet will be energized and the spring 61 will be released to return the piston 60 to upper position. This movement of the piston 60 will cause the spring 75 to apply pressure again between the contacts 38 and 39 thereby establishing the electrical circuit to the magnet 80. In this manner the piston 60 is reciprocated and liquid is caused to flow from the tank 20 through the fuel duct and out through pipe connection 54.

One of the advantages of the present invention is that it may be constructed as a unitary structure, separate from the tank and may be quickly attached to the tank. Another advantage lies in simplicity of construction, which has been brought about particularly by placing movable elements of the pump and the movable contact support in tandem relation. By this arrangement the construction of the mechanism for controlling the contacts is much simplified. The piston 60 cooperates directly with the spring which controls the pressure between the contacts.

While the form of embodiment of the invention as herein disclosed, constitutes a preferred form, it is to be understood that other forms might be adopted, all coming within the scope of the claims which follow.

What is claimed is as follows:

1. A liquid pump comprising, in combination, a non-magnetizable cylinder, a magnetizable tubular piston slidable within the cylinder, an electromagnet surrounding the cylinder for operating the piston, a tubular duct connected with the cylinder outlet end and aligned with the cylinder and providing a pump outlet, a circuit breaker contact insulatingly supported by and within the tubular duct and in alignment with the piston, a movable contact located between the piston and stationary contact, and a spring located between the piston and movable contact and movable with the piston.

2. A liquid pump comprising, in combination, a magnetizable cup-shaped member, a magnetizable cover for said member, a tubular magnetizable core supported by the bottom wall of the cup member, a non-magnetizable cylinder supported by and continuing from the core and extending through the cover and supported thereby, a magnetizable piston within the cylinder, a fuel outlet and circuit interrupter housing member attached to and extending from the cylinder, a check valve in the tubular core, a check valve carried by the piston, a magnet coil within the cup member and surrounding the cylinder, and a circuit interrupter within the housing and operated by the piston for controlling the magnet coil.

3. A liquid pump comprising, in combination, a non-magnetizable cylinder, a tubular magnetizable core attached to one end of the cylinder, a liquid outlet and circuit interrupter housing member attached to the other end of the cylinder and having an end wall in alignment with the cylinder bore, a magnet coil surrounding the core and cylinder, a magnetizable piston within the cylinder, a check valve within the core, a check valve carried by the upper end of the piston and having a valve cage, an interrupter contact insulatingly supported by the end wall of the housing member and in alignment with the piston, a coiled spring within the housing member and bearing at one end against the piston valve cage, and a movable interrupter contact supported by the other end of the spring.

In testimony whereof we hereto affix our signatures.

WILLIAM A. CHRYST.
HERBERT C. WALTERS.